US007813551B2

(12) United States Patent
Usuda

(10) Patent No.: US 7,813,551 B2
(45) Date of Patent: Oct. 12, 2010

(54) TERMINAL DEVICE AND COMMUNICATION METHOD

(75) Inventor: Hiroshi Usuda, Tokyo (JP)

(73) Assignee: Sony Corporation (JP)

(*) Notice: Subject to any disclaimer, the term of this patent is extended or adjusted under 35 U.S.C. 154(b) by 2096 days.

(21) Appl. No.: 10/657,364

(22) Filed: Sep. 8, 2003

(65) Prior Publication Data
US 2004/0046993 A1 Mar. 11, 2004

(30) Foreign Application Priority Data
Sep. 9, 2002 (JP) ............................ P2002-263337

(51) Int. Cl.
G06K 9/00 (2006.01)
(52) U.S. Cl. ..................... 382/181; 358/1.15
(58) Field of Classification Search ................ 382/197, 382/181; 358/1.14, 1.15
See application file for complete search history.

(56) References Cited

U.S. PATENT DOCUMENTS

| 5,200,993 | A | * | 4/1993 | Wheeler et al. | 379/93.02 |
| 5,227,893 | A | * | 7/1993 | Ett | 358/400 |
| 5,552,901 | A | * | 9/1996 | Kikuchi et al. | 358/468 |
| 5,802,469 | A | * | 9/1998 | Nounin et al. | 455/422.1 |
| 6,466,329 | B1 | * | 10/2002 | Mukai | 358/1.15 |
| 6,477,567 | B1 | * | 11/2002 | Ohara | 709/223 |
| 7,072,654 | B2 | * | 7/2006 | Fujiwara et al. | 455/435.1 |
| 7,130,251 | B1 | * | 10/2006 | Morohashi | 369/47.13 |
| 7,349,577 | B2 | * | 3/2008 | Kaneda et al. | 382/190 |
| 7,555,361 | B2 | * | 6/2009 | Nakamura et al. | 700/237 |
| 2001/0013012 | A1 | * | 8/2001 | Hanaoka et al. | 705/14 |
| 2001/0032252 | A1 | * | 10/2001 | Durst et al. | 709/218 |
| 2001/0056310 | A1 | * | 12/2001 | Aoki | 700/116 |
| 2002/0053031 | A1 | * | 5/2002 | Bendinelli et al. | 713/201 |
| 2002/0116343 | A1 | * | 8/2002 | Nakamura et al. | 705/65 |
| 2003/0061100 | A1 | * | 3/2003 | Minowa | 705/14 |
| 2003/0120729 | A1 | * | 6/2003 | Kim et al. | 709/203 |
| 2004/0076152 | A1 | * | 4/2004 | Kimura et al. | 370/389 |
| 2004/0078169 | A1 | * | 4/2004 | Oba et al. | 702/186 |
| 2004/0093309 | A1 | * | 5/2004 | Nakamura et al. | 705/65 |
| 2004/0117445 | A9 | * | 6/2004 | Lee et al. | 709/205 |

FOREIGN PATENT DOCUMENTS

| JP | 10-214318 A | 8/1998 |
| JP | 2000-285056 A | 10/2000 |
| JP | 2002-125035 A | 4/2002 |
| JP | 2002-135451 A | 5/2002 |
| JP | 2002-215966 A | 8/2002 |
| JP | 2002-230259 A | 8/2002 |
| JP | 2002-245193 A | 8/2002 |

* cited by examiner

Primary Examiner—Daniel G Mariam
Assistant Examiner—Aklilu k Woldemariam
(74) Attorney, Agent, or Firm—Lerner, David, Littenberg, Krumholz & Mentlik, LLP

(57) ABSTRACT

A terminal device includes an input unit operable to input a first graphic code that corresponds to first information from a medium printed with a first series of graphic codes and a communication unit operable to use the first information as terminal identification information to establish communication through a network. The input unit inputs a second graphic code from a medium printed with a second series of graphic codes, the second graphic code corresponding to second information associated with the first information. The communication unit includes an acquiring unit operable to acquire the second information corresponding to the second graphic code.

16 Claims, 23 Drawing Sheets

FIG. 3
         
CODE = 1   CODE = 2   CODE = 3   CODE = 4
         
CODE = 5   CODE = 6   CODE = 7   CODE = 8

FIG. 6

| DIRECTION OF IMAGE PATTERN | CHARACTERISTICS |
|---|---|
| UP | ASPECT RATIO 5:2<br>BARYCENTRIC POSITION: LOWER HALF OF RECTANGLE |
| DOWN | ASPECT RATIO: 5:2<br>BARYCENTRIC POSITION: UPPER HALF OF RECTANGLE |
| RIGHT | ASPECT RATIO: 2:5<br>BARYCENTRIC POSITION: LEFT HALF OF RECTANGLE |
| LEFT | ASPECT RATIO: 2:5<br>BARYCENTRIC POSITION: RIGHT HALF OF RECTANGLE |
| RIGHT UP | ASPECT RATIO: 1:1<br>BARYCENTRIC POSITION: LOWER-LEFT AREA OF RECTANGLE |
| RIGHT DOWN | ASPECT RATIO: 1:1<br>BARYCENTRIC POSITION: UPPER-LEFT AREA OF RECTANGLE |
| LEFT UP | ASPECT RATIO: 1:1<br>BARYCENTRIC POSITION: LOWER-RIGHT AREA OF RECTANGLE |
| LEFT DOWN | ASPECT RATIO: 1:1<br>BARYCENTRIC POSITION: UPPER-RIGHT AREA OF RECTANGLE |

FIG. 7
| GRAPHIC CODE | CODE |
|:---:|:---:|
| 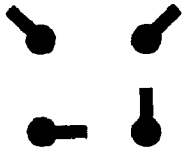 | [8231] |
| 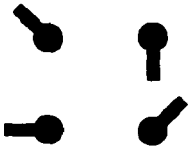 | [8572] |
| 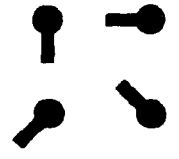 | [5768] |
| 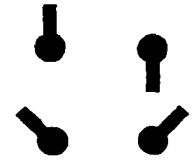 | [1582] |
| 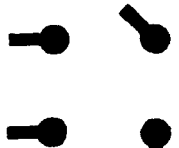 | [7875] |
| ⋮ | ⋮ |

FIG. 9
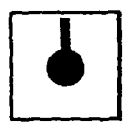
REGISTRATION
1
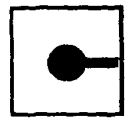
REFERENCE
3
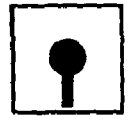
EXCHANGE
5
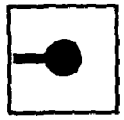
DELETE
7
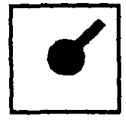
GROUP
REGISTRATION
2
DOWNLOAD
4
OK
6
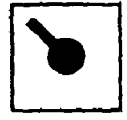
CANCEL
8

FIG. 13

| CONTENT CODE | CONTENT URL |
|---|---|
| WHICH CONTENT URL DO YOU ALLOCATE CONTENT CODE TO? | |
| ⬛ | |
| ⬛ | |
| ⬛ | |
| ⬛ | |
| ⋮ | ⋮ |

FIG. 14

| CONTENT CODE | CONTENT URL |
|---|---|
|  | http://www.aaa.co.jp/audi.jpg |
|  |  |
|  |  |
|  |  |
| ⋮ | ⋮ |

FIG. 17
| | |
|---|---|
| \multicolumn{2}{c}{WHICH CONTENT REGISTRATION DO YOU CANCEL?} |
|  | http://www.aaa.co.jp/audi.jpg |
|  | http://www.aaa.co.jp/ferarri.bmp |
|  | http://www.aaa.co.jp/bmw.bmp |
|  | http://www.aaa.co.jp/porche.bmp |
| ⋮ | ⋮ |

FIG. 18

| CONTENT CODE | CONTENT URL |
|---|---|
|  | BLANK |
|  | http://www.aaa.co.jp/ferarri.bmp |
|  | http://www.aaa.co.jp/bmw.bmp |
|  | http://www.aaa.co.jp/porche.bmp |
| ⋮ | ⋮ |

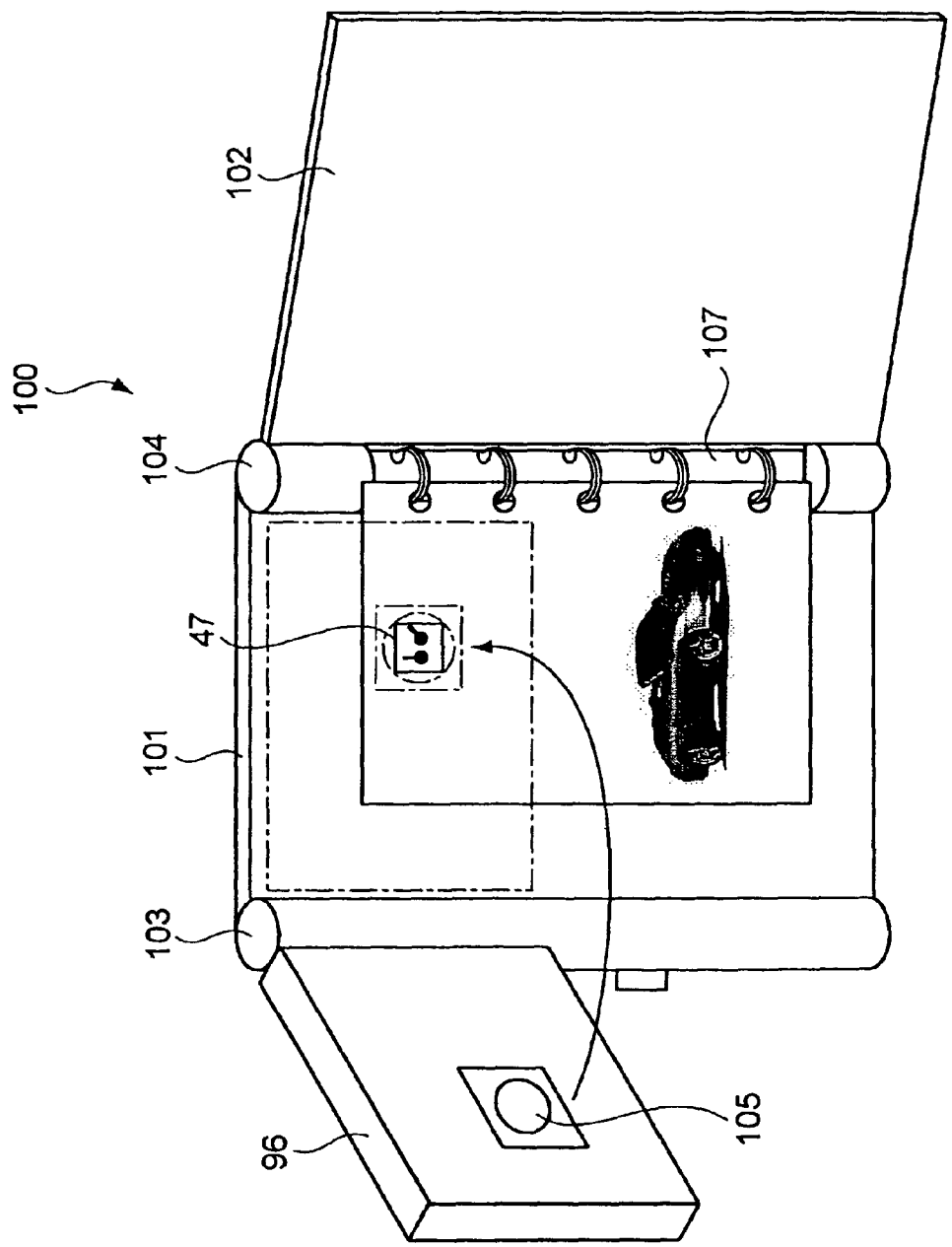

TERMINAL DEVICE AND COMMUNICATION METHOD

CROSS-REFERENCE TO RELATED APPLICATIONS

The present application claims priority from Japanese Application No. 2002-263337 filed Sep. 9, 2002, the disclosure of which is hereby incorporated by reference herein.

BACKGROUND OF THE INVENTION

The present invention relates to a terminal device and a communication method for radio communication or communication over the Internet.

At present, content or other information is generally downloaded from the Internet by using portable terminals, such as personal computers or mobile phones. However, when servers that store the content and the like distribute them to data terminals, such as personal computers or mobile phones, larger server systems are required as the number of data terminal users increase. Since the number of data terminals that can access one server is limited, many more server systems must be provided in order to overcome this limitation and therefore a lot of investment is required. Additionally, a high-speed and high-capacity communication network is required in order for these data terminals to simultaneously access the server.

Network technologies for solving the problems described above include a multicast technology. With the multicast technology, data is simultaneously transmitted to a number of data terminals. The multicast technology distributes information within a predetermined bandwidth of an information network without specifying the receivers of the information. In contrast, unicast technology transmits data in one-to-one correspondence, in which a server only transmits data to one data terminal. The larger the number of data terminals, the heavier the load on the server with unicast technology.

However, even in multicast communications, it is difficult to say whether the operating method at the data terminals that receive the content and other information, for example, the operation of various buttons on a mobile phone or a portable terminal, is intuitive for people. Furthermore, although current personal computers and the like are becoming easy to use, mixed operations of a keyboard and a mouse make it difficult for beginners or elders to operate personal computers.

SUMMARY OF THE INVENTION

Accordingly, it is an object of the present invention to provide a terminal device and a communication method that is capable of easy information handling and capable of easily distributing and receiving content and other information.

The present invention provides, in its first aspect, a terminal device including an input unit operable to input from a printed medium a first graphic code corresponding to first information; and a communication unit operable to use the first information as terminal identification information to establish communication through a network.

The first graphic code may be any information, for example, barcode information, which the terminal device can read and identify. Alternatively, the first graphic code may be information encoded in accordance with predetermined image patterns, such as the turning directions of predetermined images. The medium on which the first graphic code is printed may include paper media, such as newspapers, magazines, catalogs, or books, and various other media. The first graphic code may be input by, for example, a camera.

According to the present invention, the first information is used as terminal identification information to establish communications through a network. The first graphic code is input from the printed medium. Accordingly, information communication can be realized without imposing a burden on the server that provides the content. The use of non-digital entities as the printed medium permits easy information handling and operations that are intuitive for people. In particular, when the information is input using a camera or the like, beginning users of electronic devices or elders can easily handle information without conventional complicated button operations or the like.

The input unit preferably is operable to input from a printed medium a second graphic code corresponding to second information associated with the first information. The communication unit preferably includes an acquiring unit operable to acquire the second information based on the second graphic code. The second information may be any information, such as content, which is the target of communication. Correspondence of the second information to the second graphic code can achieve the simple handling of the second information.

The present invention provides, in its second aspect, a communication method, including inputting from a printed medium a first graphic code corresponding to first information; and using the first information as terminal identification information to establish communication through a network.

The present invention provides, in its third aspect, a server including a storage unit operable to store operating instructions and pieces of content, each of the operating instructions corresponding to one of a first series of graphic codes and each of the pieces of content corresponding to one of a second series of graphic codes; an input unit operable to input from a printed medium a selected one of the first series of graphic codes corresponding to one of the operating instructions and a selected one of the second series of graphic codes corresponding to one of the pieces of content; and an operating unit operable to execute the one of the operating instructions with respect to the one of the pieces of content.

According to a fourth aspect, the present invention provides a method of processing content, including establishing a series of operating instructions and a first series of graphic codes, each of the graphic codes in the first series of graphic codes corresponding to one of the operating instructions; storing pieces of content and a second series of graphic codes, each of the graphic codes in the second series of graphic codes corresponding to one of the pieces of content; selecting one of the operating instructions by inputting from a printed medium one of the first series of graphic codes corresponding to the selected operating instruction; selecting one of the pieces of content by inputting from a printed medium one of the second series of graphic codes corresponding to the selected piece of content; and processing the selected piece of content based on the selected operating instruction.

The method according to the fourth aspect of the invention may further include storing storage locations for each of the pieces of content and a third series of graphic codes, each of the graphic codes in the third series of graphic codes corresponding to one of the storage locations; inputting from a printed medium one of the third series of graphic codes corresponding to the storage location of the selected piece of content; and retrieving the selected piece of content from the storage location.

The present invention, in its fifth aspect, provides a communication network, including a server operable to store data;

and a plurality of terminal devices operable to send data to the server and to receive data from the server, each of the terminal devices including an input unit operable to input from a printed medium a first graphic code corresponding to first information, and a communication unit operable to use the first information as terminal identification information to establish communication with the server.

The server according to the fifth aspect of the invention may include a storage unit operable to store operating instructions and pieces of content, each of the operating instructions corresponding to one of a first series of graphic codes and each of the pieces of content corresponding to one of a second series of graphic codes; an input unit operable to input from a printed medium a selected one of the first series of graphic codes corresponding to one of the operating instructions and a selected one of the second series of graphic codes corresponding to one of the pieces of content; and an operating unit operable to execute the one of the operating instructions with respect to the one of the pieces of content.

According to a sixth aspect of the present invention, a method of downloading content from a storage unit to a terminal device is provided, including storing in the storage unit terminal identification information for the terminal device; storing in the storage unit pieces of content and a first series of graphic codes, each of the graphic codes in the first series of graphic codes corresponding to one of the pieces of content; selecting one of the pieces of content at the terminal device by inputting from a printed medium one of the graphic codes in the first series of graphic codes corresponding to the selected piece of content; converting the one of the graphic codes in the first series of graphic codes into content information corresponding to the selected piece of content; transmitting the content information and the terminal identification information from the terminal device to the storage unit; retrieving the selected piece of content based on the content information; and transmitting the selected piece of content from the storage unit to the terminal device based on the terminal identification information.

The method according to the sixth aspect of the present invention may further include establishing a series of operating instructions and a second series of graphic codes, each of the graphic codes in the second series of graphic codes corresponding to one of the operating instructions, the series of operating instructions including a download operating instruction; selecting the download operating instruction at the terminal device by inputting from a printed medium one of the graphic codes in the second series of graphic codes corresponding to the download operating instruction; converting the one of the graphic codes in the second series of graphic codes into operating information corresponding to the download operating instruction; transmitting the operating information from the terminal device to the storage unit; and transmitting the selected piece of content from the storage unit to the terminal device based on the terminal identification information and the operating information.

As described above, according to the present invention, simple information handling can be achieved and information such as pieces of content can be simply distributed and received.

The above and other objects, features, and advantages of the present invention will become clear from the following description of the preferred embodiments taken in conjunction with the accompanying drawings.

BRIEF DESCRIPTION OF THE DRAWINGS

FIG. 3 shows the relationship between the turning modes of image patterns included in graphic codes and codes;

FIG. 6 shows an example of a direction characteristic table;

FIG. 7 shows an example of a code candidate group used for determining code recognition results;

FIG. 9 shows a list of basic code operations;

FIG. 13 shows an example of a content-allocation screen;

FIG. 14 shows an example of a content table having allocated content;

FIG. 17 shows an example screen for canceling the registration of the content;

FIG. 18 an example of a registration-canceled screen, in which the registration of a piece of content has been canceled;

FIG. 23 shows an example of the binder-type data terminal in use.

DETAILED DESCRIPTION

Embodiments of the present invention will now be described with reference to the attached drawings.

Figure 1:
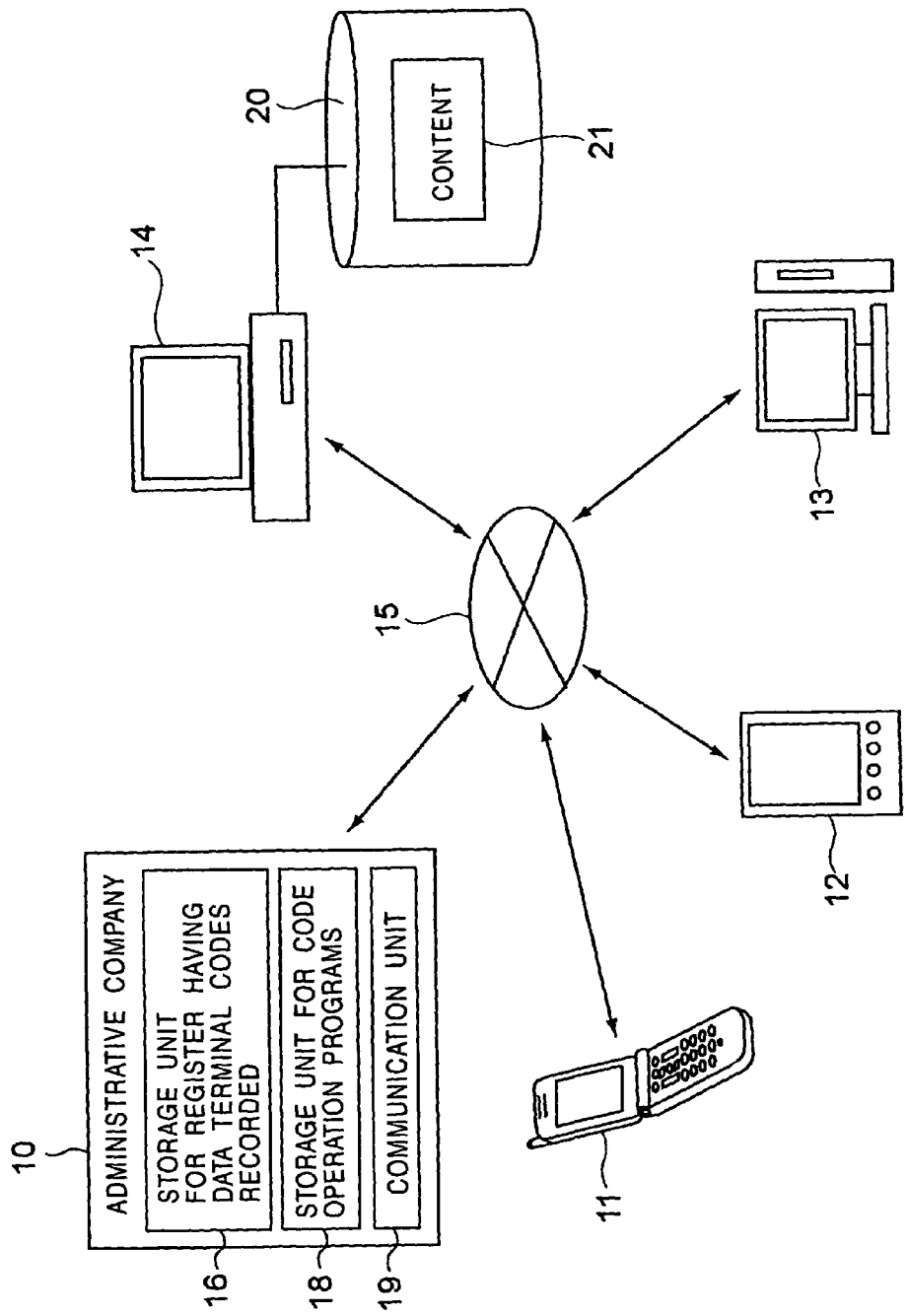
FIG. 1 shows the network structure of a content-providing system according to an embodiment of the present invention.

FIG. 1 shows the network structure of a content-providing system according to an embodiment of the present invention.

The content-providing system includes a network 15, such as the Internet. A server 14 that, for example, stores pieces of content to be provided and a computer in an administrative company 10 that administers the entire network 15 are connected to the network 15. Various terminals, such as a mobile phone 11, another kind of portable terminal 12, and a personal computer 13, are also connected to the network 15.

According to this embodiment, the network 15 distributes information using multicast technology and multiple channels. However, the network 15 may be a communication network that can utilize multiple channels and a unicast channel. The multiple channels are used in the content-providing system of this embodiment where there are mixed channels.

The server 14 stores content 21 in, for example, a storage device 20. The content 21 is primarily prepared by an administrator of the server 14. The content 21 includes various kinds of content, such as scenic images and other images photographed by the administrator with a digital camera, music, movies, documents, and application programs.

The computer in the administrative company 10 has a storage unit 16 that stores a register having data terminal codes recorded therein, a storage unit 18 for code operation programs, and a communication unit 19. The computer in the administrative company 10 also has a CPU, a necessary RAM, and so on (not shown).

The data terminal codes are codes assigned only to the data terminals that are registered at the administrative company 10, among, for example, the mobile phone 11, the other kind of portable terminal 12, the personal computer 13, and the server 14, which are data terminals that can utilize the multiple channels on the network 15. The data terminal codes are IDs for identifying the data terminals 11, 12, 13, and 14, and are unique to each of them. The code operation programs stored in the storage unit 18 are programs that allow the data terminals registered at the administrative company 10 to perform the code operations, as described below. The communication unit 19 transmits and receives information over the network 15.

Graphic code information, including information on the data terminal codes, will now be described.

Figure 2:
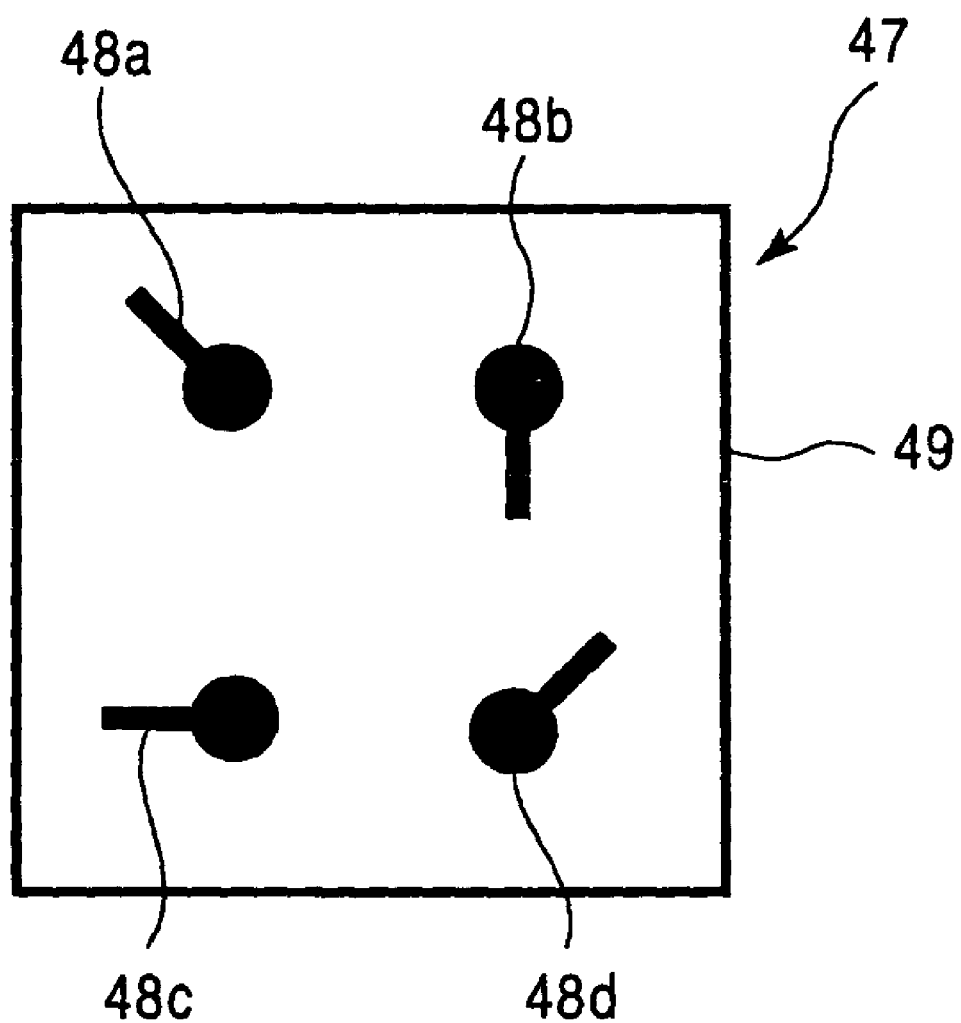
FIG. 2 shows an example of a graphic code.

FIG. 2 shows an example of a graphic code 47. Referring to FIG. 2, the graphic code 47 includes one or more image patterns 48 (48a, 48b, 48c, and 48d) and a square frameline 49 surrounding these image patterns 48 (48a, 48b, 48c, and 48d).

As shown in FIG. 3, the image patterns 48 have eight turning modes, to which eight codes are allocated based on their directions. Hence, for example, four image patterns can be used to define $8^4=4096$ codes. The graphic code 47 in FIG. 2 has, for example, a code of "8572". More than four image patterns are used in order to define more than 4,096 codes.

Figure 4:
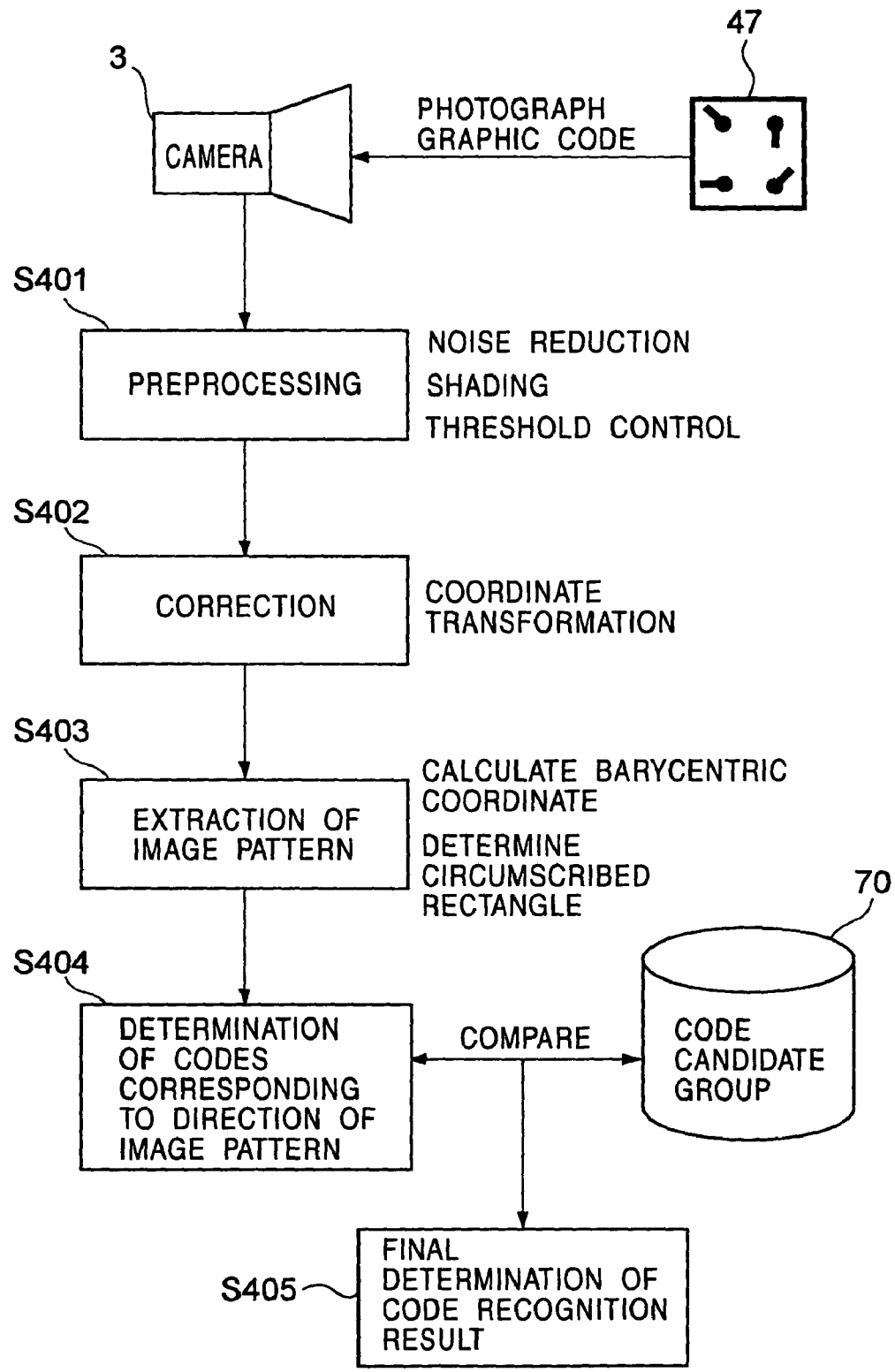
FIG. 4 is a flowchart of the process for recognizing the codes from among the graphic codes on an information input medium.

FIG. 4 is a flowchart of the process for recognizing the graphic code 47.

The process for recognizing the graphic code 47 by a user of a data terminal, for example, the mobile phone 11, will now be described. The mobile phone 11 is provided with a camera 3. The camera 3 may be, for example, a camera that can be externally connectable to the mobile phone 11. Preferable examples of the mobile phone 11 and the like will be described in detail below.

The user switches an ordinary imaging mode to a code recognition mode through a button operation or the like in the mobile phone 11 for photographing the graphic code 47 to cause the mobile phone 11 to recognize the code. After the code recognition mode is set, the following process for code recognition is performed for the image data photographed by the camera 3.

In Step S401, the process performs preprocessing of the image data, such as noise reduction, shading, and threshold control. Next, the process detects the frameline 49 from the entire image and extracts the image data in the detected frameline 49. In Step S402, the process corrects the inclination and the size of the image data in the frameline 49 by coordinate transformation based on the inclination, the length of each side, and the like of the frameline 49 that is detected.

Figure 5:
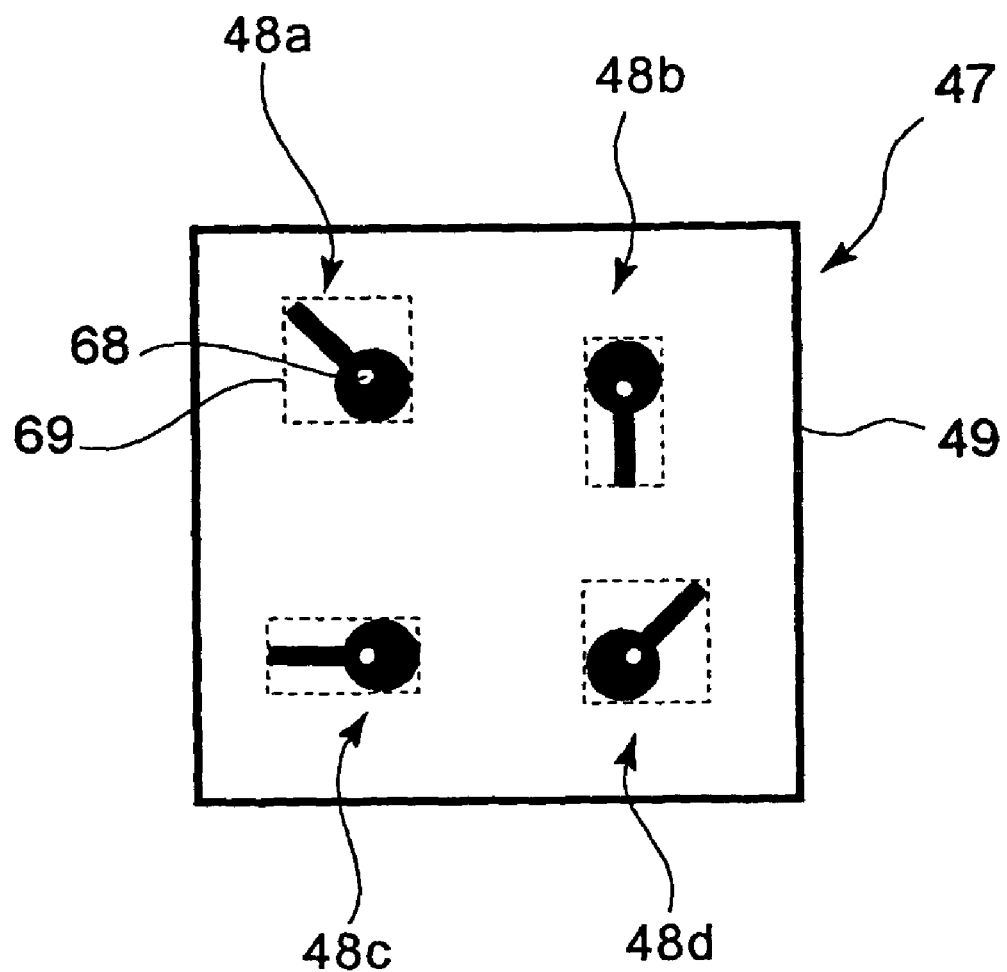
FIG. 5 shows the extraction process of the image patterns.

In Step S403, the process extracts individual image patterns from the image data that has been corrected in the frameline 49. This step of extracting the image patterns is performed by, for example, calculating the barycentric coordinates 68 of gray values of the individual image patterns 48 and determining the circumscribed rectangles 69 of the individual image patterns 48, as shown in FIG. 5.

Next, the process determines the turning modes (directions) of the image patterns 48 by referring to a direction characteristic table, as shown in FIG. 6, using as parameters the barycentric coordinates 68 of the gray values of the image patterns 48 and the aspect ratios of the circumscribed rectangles 69 of the image patterns 48, which are determined in the step of extracting the image patterns. In Step S404, the process determines the codes corresponding to the determined directions of the image patterns based on the relationship between the directions of the image patterns and the codes shown in FIG. 3.

In Step S405, the process compares the codes determined for the four image patterns with codes in a predetermined code candidate group 70 as shown in FIG. 7 to finally determine a graphic code having the smallest difference to the determined graphic code in the code candidate group 70, as the recognition result of the graphic code 47. The difference here means the sum of the differences in the turning direction between the determined graphic codes and the predetermined codes for the four image patterns. Any difference exceeding a predetermined threshold value is determined to be out of recognition.

In this way, the mobile phone 11 obtains numeric code information from the graphic code 47.

Figure 8:
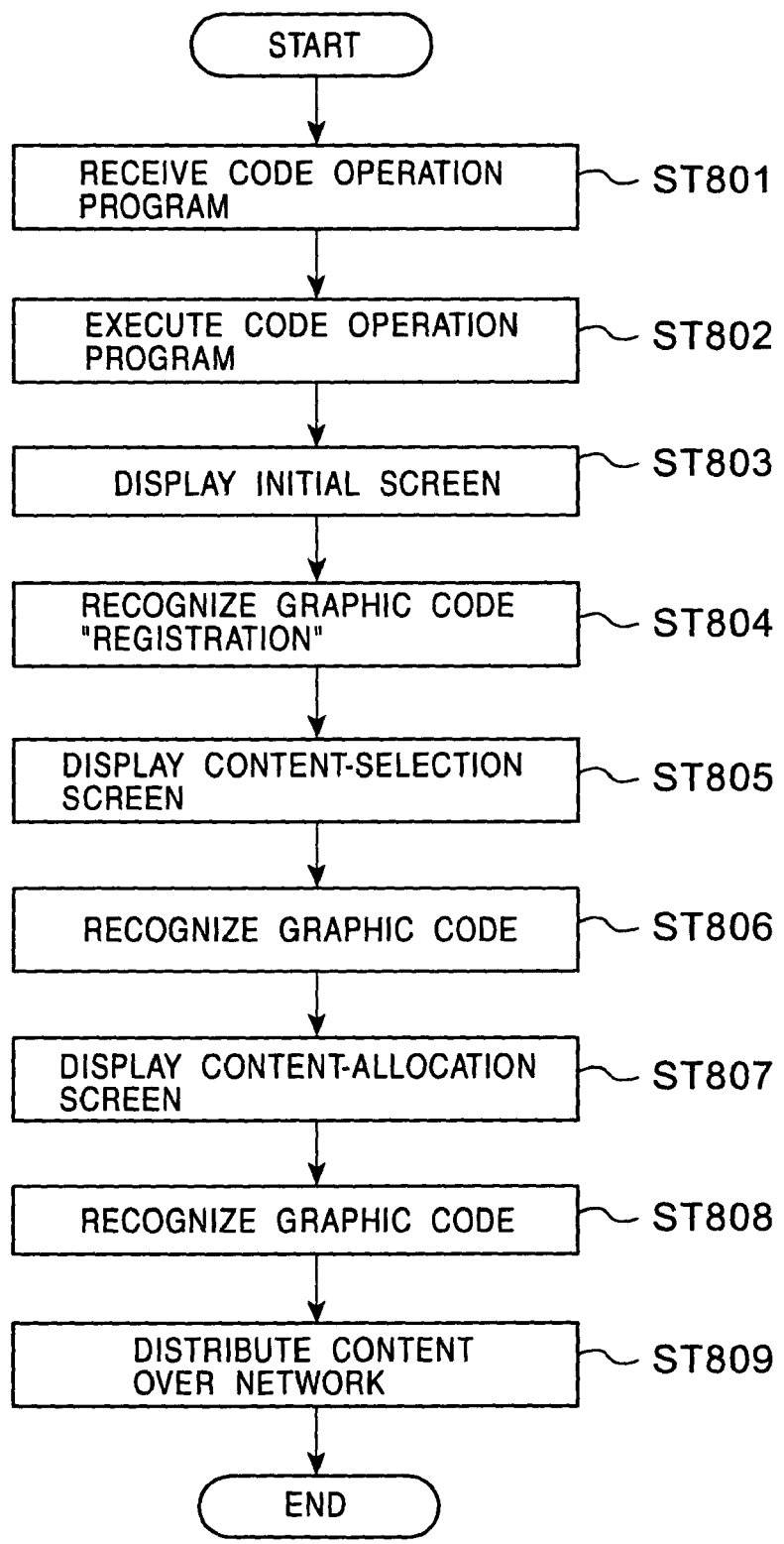
FIG. 8 is a flowchart showing the process for distributing content by a server.

The process of distributing the content prepared in the manner described above by the administrator of the server 14 in FIG. 1 over the network 15 will now be described. FIG. 8 is a flowchart of this process.

Figure 10:
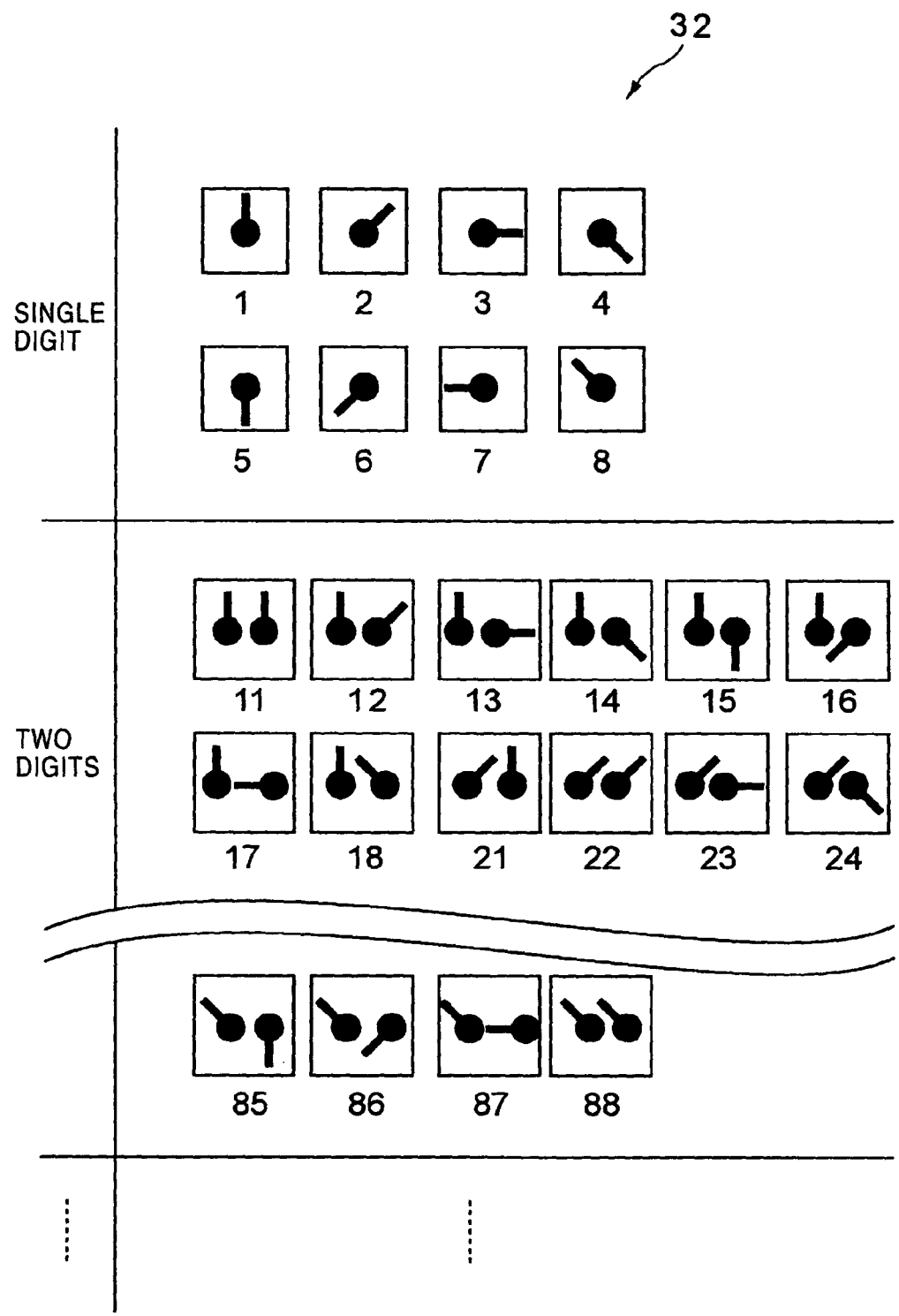
FIG. 10 shows a graphic code table.

Before the server 14 distributes the content over the network 15, the administrator of the server 14 applies for registration of the server 14 to the administrative company 10 by, for example, telephone or email. The administrative company 10 registers, for example, the graphic code 47 in FIG. 2 as the data terminal code unique to the server 14. The administrative company 10 stores the graphic code 47 in the storage unit 16. The administrative company 10 prints the data terminal code, such as "8572" (the numeric code of the graphic code 47 shown in FIG. 2), on a sheet of paper or the like to mail it to the administrator of the server 14, for example, in the form of a sealed letter or a postcard. At the same time, the administrative company 10 sends the code operation program stored in the storage unit 18 over the network 15. In Step ST801, the server 14 receives the code operation program sent from the administrative company 10. The administrative company 10 mails a list 31 of the basic code operations in FIG. 9 and a graphic code table 32 in FIG. 10, which are required for operating the graphic codes, in the form of a sealed letter or a postcard. The list 31 and the graphic code table 32 are printed on a sheet of paper or the like.

Referring to FIG. 9, the list 31 includes "registration", "reference", "exchange", "delete", "group registration", "download", "OK", and "cancel".

In Step ST802 in FIG. 8, the administrator of the server 14 installs the code operation program sent from the administrative company 10 in the server 14 to execute it. The server 14 may automatically install the code operation program upon the receipt of it. Alternatively, the administrator of the server 14 may buy the code operation program sold by a seller.

Figure 11:
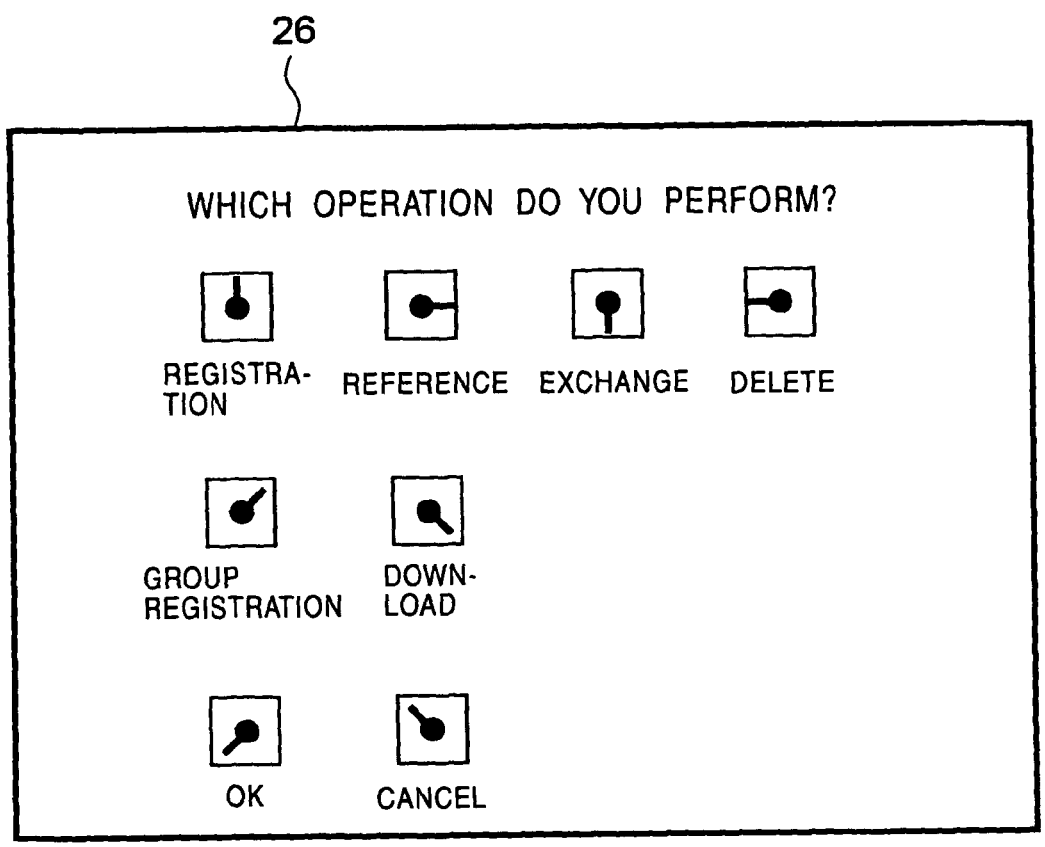
FIG. 11 shows an example of an initial screen.

After the code operation program is installed and executed, in Step ST803, the process displays an initial screen 26 for the code operations shown in FIG. 11 on a display unit or the like. This initial screen 26 displays the codes printed on the list 31 in FIG. 9.

The administrator of the server 14 selects "registration". Namely, in Step ST804, the administrator causes a camera to be close to a position where the graphic code "registration" is displayed and causes the server 14 to recognize the graphic code "registration". The graphic code "registration" means that the administrator is registering content for distribution over the network 15.

Figure 12:
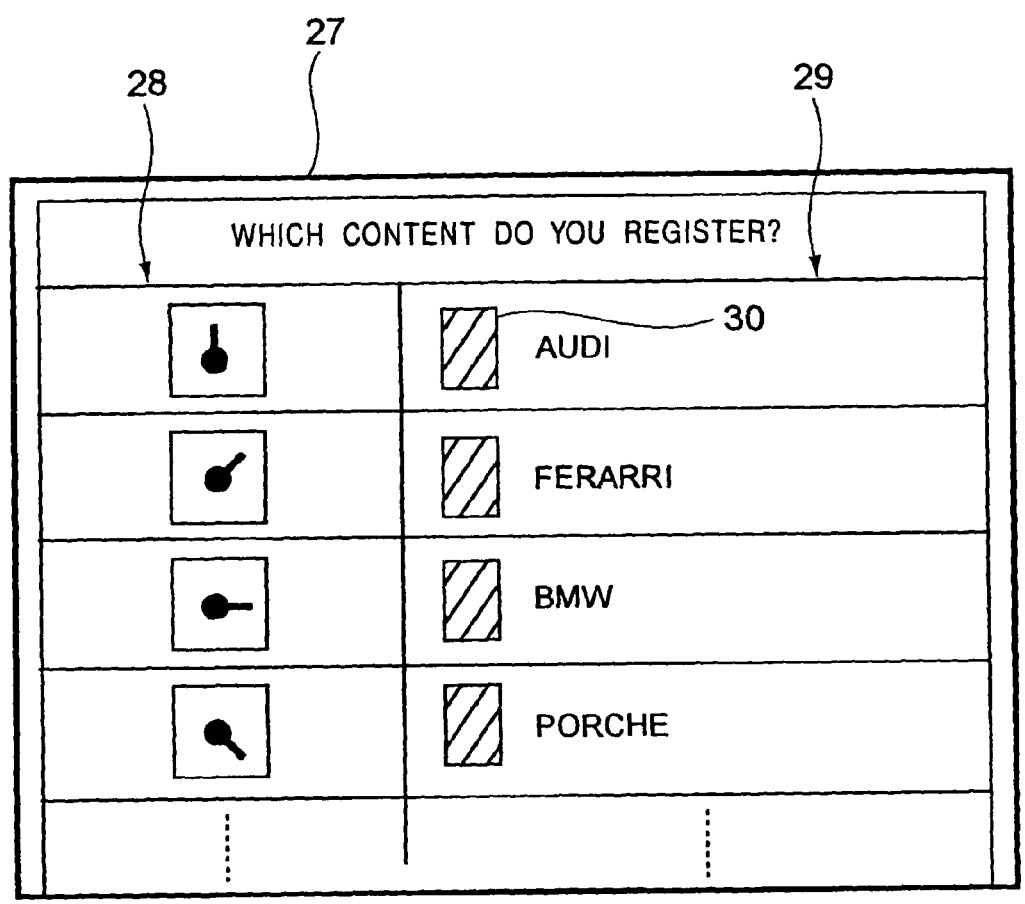
FIG. 12 shows an example of a content-selection screen.

After the graphic code "registration" is recognized, in Step ST805, the process displays a content-selection screen 27 shown in FIG. 12 in the display unit. This content-selection screen 27 displays files (content) that are stored in the storage device 20 of the server 14 and the graphic codes associated therewith. The files are displayed as, for example, icons 30. A column 28 of the graphic codes sequentially displays, for example, the code information in FIG. 3 starting from the code "1". A column 29 of the files displays the files extracted from the storage device 20 by the code operation program appropriately or in accordance with a predetermined rule. Although single-digit graphic codes are displayed in FIG. 12, graphic codes having more than one digit, for example, three-digit or four-digit graphic codes, may be displayed if the amount of content stored is large.

In Step ST806, the administrator of the server 14 photographs the graphic code "1" with the camera, while referring to the content-selection screen 27 and the graphic code table 32, to cause the server 14 to recognize the graphic code in order to register content "AUDI" that is the image of a car.

Figure 13:
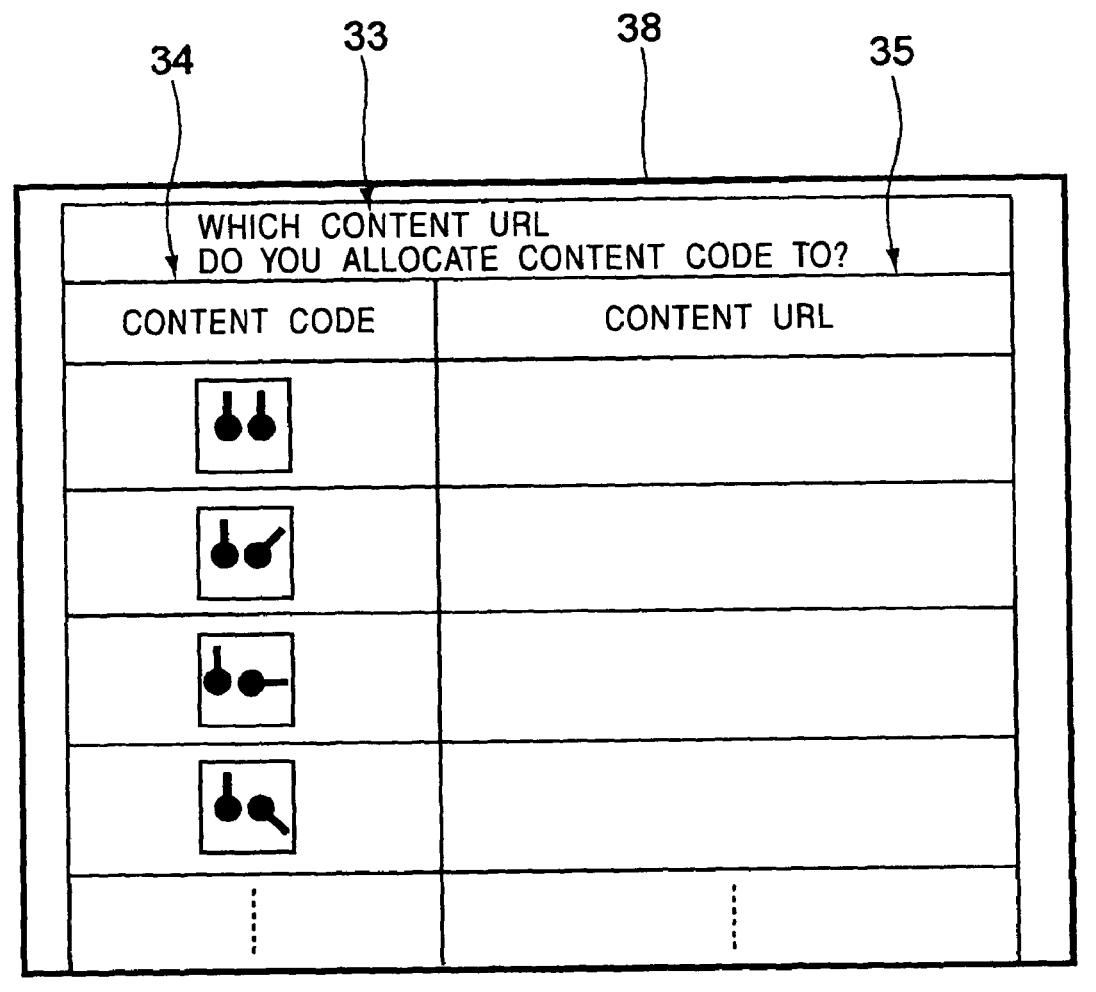

In Step ST807, the process displays a content-allocation screen 38 as shown in FIG. 13. The administrator of the server 14 determines which content code corresponds to the selected content. A content table 33 is displayed on this content-allocation screen 38. The content table 33 has a content URL (Uniform Resource Locator) column 35 that displays the storage location of the content to be allocated and a content code column 34 that displays the content codes corresponding to the content. Specifically, in Step ST808, the administrator of the server 14 causes the camera to be close to the graphic code table 32 to photograph the graphic code "11", while referring to the content-allocation screen 38 and the graphic code table 32 printed on a sheet of paper in FIG. 10, in order to cause the server 14 to recognize the graphic code and allocate it.

The content table 33 shown in FIG. 14 is displayed and the registration is completed. In Step ST809, the process distributes the content over the network 15.

"Cancel" in the list 31 of the basic code operations is recognized in order to cancel any of the steps in FIG. 8.

The administrator of the server 14 can print his/her car image and the like on a medium, such as a magazine, to introduce them as articles for sale. A form of this process will now be described.

Figure 15:
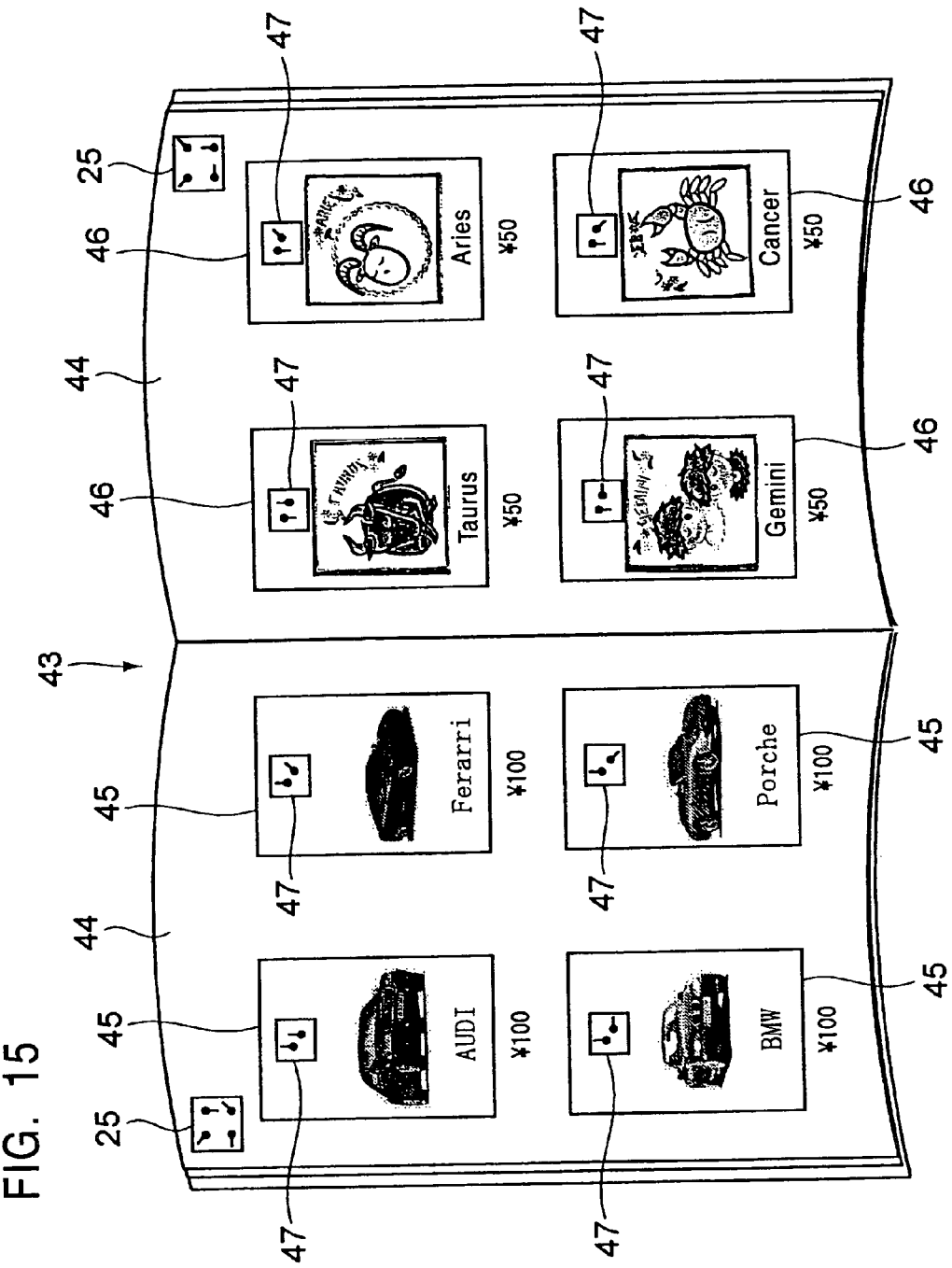
FIG. 15 shows an example of an information input medium.

FIG. 15 shows an example of an information input medium 43 including the graphic codes 47 representing content codes. The information input medium 43 in FIG. 15 is a booklet-type medium. Each page 44 of the information input medium 43 includes at least, for example, four car images 45 or four horoscope images 46 as the content, and price information of the corresponding content.

The car images 45 are images distributed by the administrator of the server 14, as described above. These car images 45 that are downloaded by each of the data terminals 11, 12, or 13 as described below are displayed on a browser or the like installed in the individual data terminals. In contrast, the horoscope images 46 are service content on the Web, which displays the horoscopes using the characters and the images on the Web.

These individual images have the corresponding graphic codes 47. Each of the graphic codes 47 is information that is associated with the corresponding image and is encoded.

Each page 44 has a data terminal code 25 at the upper-left or the upper-right corner. The data terminal code 25 on the left page in FIG. 15 is a terminal code unique to the server 14.

Figure 16:
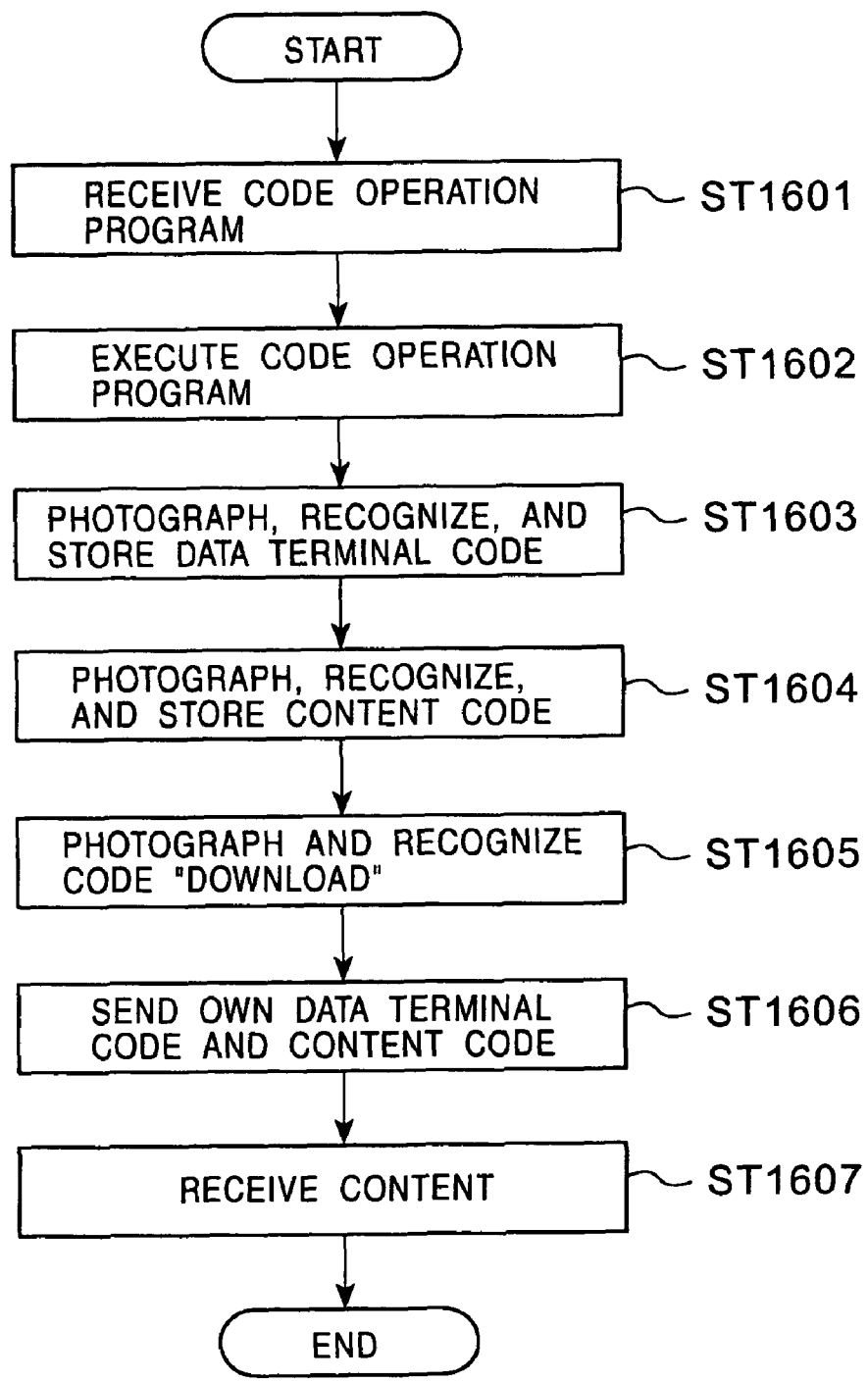
FIG. 16 is a flowchart of the process for downloading the content by a data terminal.

The booklet-type information input medium 43 described above may be issued by the administrative company 10. The process by which a user of a data terminal, for example the mobile phone 11, buys the booklet-type information input medium 43 described above to download the content will now be described. FIG. 16 is a flowchart of this process.

The user of the mobile phone 11 registers his/her own terminal in the same manner in which the administrator of the server 14 registers the server 14 at the administrative company 10. In Step ST1601, the user of the mobile phone 11 receives the code operation program and, in Step ST1602, installs the code operation program to execute it. Also in this case, the code operation program may be automatically installed upon the receipt of it. Steps ST1601 and ST1602 are the same as Steps ST801 and ST802 in the flowchart shown in FIG. 8. The mobile phone 11 or the like acquires the unique data terminal code 25 for identifying the corresponding data terminal with the code operation program. The registration at the administrative company 10 may be performed through button operations on the mobile phone 11.

The user of the mobile phone 11 refers to the car images 45 and the prices thereof on each page 44 of the information input medium 43 to select desirable content. For example, when the user wants to browse "BMW" (having a content code "13") stored in the server 14 (having the data terminal code "8572"), in Step ST1603, the user photographs the data terminal code 25 shown in the upper-left corner of the left page 44 with the camera or the like provided in the mobile phone 11 to cause the mobile phone 11 to recognize the data terminal code 25. The process from photographing to recognition is similar to the process described above. After recognition, the mobile phone 11 stores the data terminal code "8572" of the server 14.

In Step ST1604, the user photographs the graphic code 47 that indicates the content code and is allocated to "BMW" to cause the mobile phone 11 to recognize the graphic code 47 and store it. In Step ST1605, the user causes the mobile phone 11 to recognize, for example, the graphic code "download" in the list 31 of the basic code operations in FIG. 9. In Step ST1606, the mobile phone 11 sends the data terminal code information (for example, "1274") of the mobile phone 11 and the selected content code "13" to the server 14 that has the specified data terminal code "8572".

The server 14 receives the data terminal code information "1274" and the selected content code "13". The server 14 then extracts the content corresponding to the content code "13" from the storage device 20 based on the content table 33 to send the extracted content to the mobile phone 11 that has the data terminal code "1274".

In Step ST1607, the mobile phone 11 receives the content "BMW" that is sent. The mobile phone 11 can download the content in this way. The server 14 may charge a fee for the content upon transmission of the content.

The process may automatically download the content upon recognition of the content code in Step ST1604 without providing the code operation "download".

The process for canceling the registration of the content that is distributed over the network 15 by the administrator of the server 14 will now be described.

For example, when the administrator of the server 14 causes the server 14 to recognize the graphic code "delete" in the list 31 in FIG. 9, a screen 39 is displayed on the display unit or the like, as shown in FIG. 17. The screen 39 is a content table that displays content codes "11", "12", "13", and "14", which are currently distributed over the network 15 and correspond to their own data terminal codes, and content URLs corresponding to the individual content codes. The administrator of the server 14 causes the camera to be close to the content code to be deleted in the graphic code table 32 while referring to the screen 39 and causes the server 14 to recognize that content code. For example, when the administrator of the server 14 causes the server 14 to recognize the content code "11", the screen 39 switches to the registration-canceled screen 40 in FIG. 18, in which the registration of the content corresponding to the content code "11" has been canceled and the message "blank" is displayed in the content URL column 35 corresponding to the content code "11".

Determining the basic code operations in advance allows the data terminals 11, 12, 13, or 14 to perform a variety of information handling. For example, when "group registration" is selected, a plurality of data terminals that receive the provision of content may constitute one group and one code may be registered at the administrative company 10 for each group of data terminals. When one data terminal among the multiple data terminals in one group downloads a piece of content, the content may be simultaneously distributed to all the other data terminals in the group. Alternatively, a plurality of servers that provide content may constitute one group and one code may be registered at the administrative company 10 for each group of servers.

The basic code operations in the list 31 are not limited to those shown in FIG. 9 and any basic code operations may be set.

According to this embodiment, since a plurality of data terminals have their own data terminal code in multiple channels on a network, information communication can be achieved without imposing a burden on a server that provides content. The data terminal codes are defined as graphics, and the content codes associated with the data terminal codes are also defined as graphics in this embodiment. The graphic codes are recognized from paper media on which these graphic codes are printed. Non-digital entities are used as media so that information handling that is intuitive for people can be easily achieved. In particular, according to this embodiment, conventional button operations or the like are not necessary for inputting the information with a camera, so that beginners of information devices or elders can easily handle the information.

Furthermore, encoding the data terminal codes, the group codes, and so on and describing them in graphic codes can prevent illegal access to the data terminals by anyone other than the users of the data terminals in this embodiment.

Even when the information input medium 43 itself has been illegally copied, the illegal utilization of other data terminals can be restricted because each data terminal has its own data terminal code.

A data terminal according to a preferred embodiment of the present invention will now be described with reference to the attached drawings.

Figure 19:
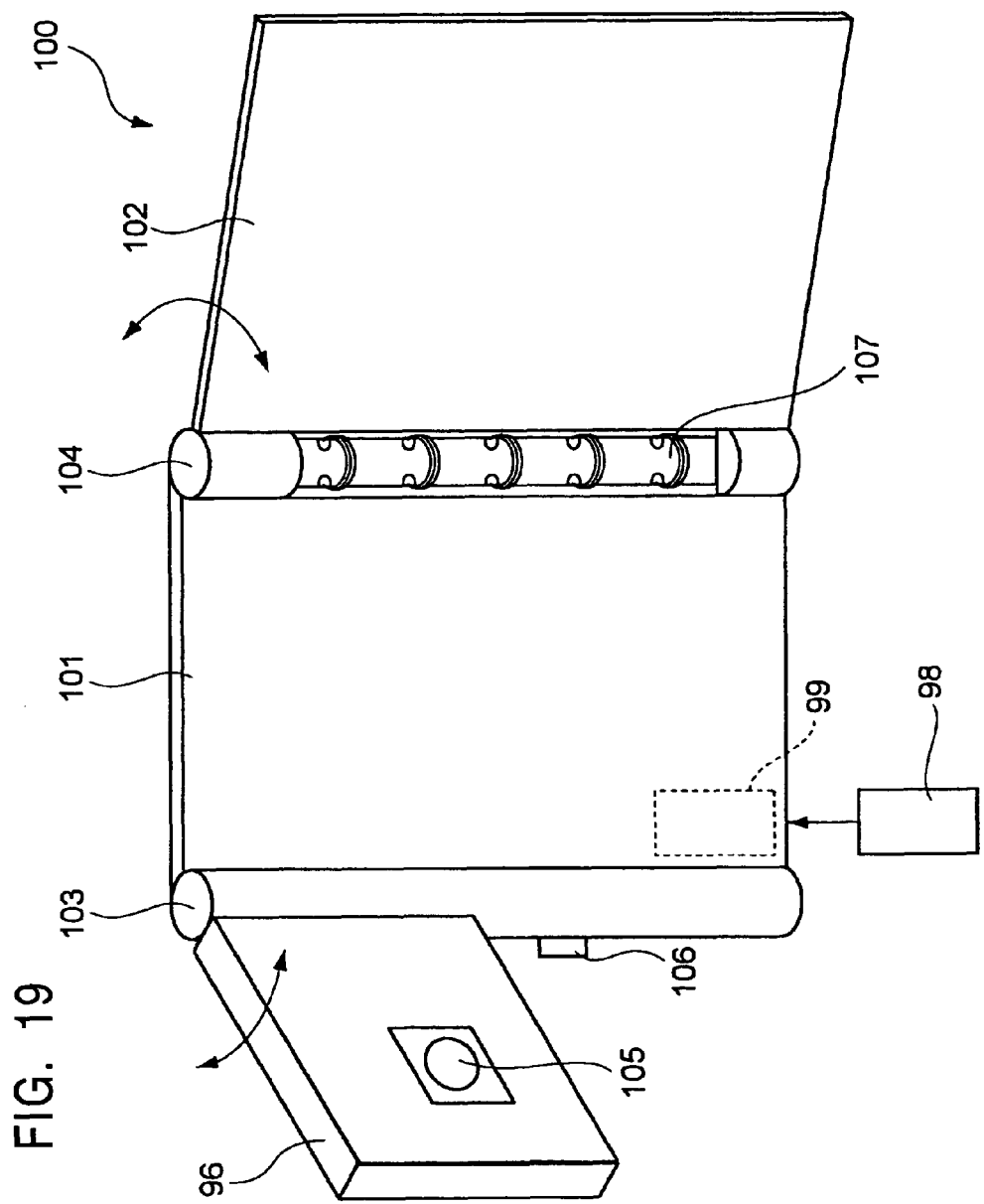
FIG. 19 is a perspective view of a binder-type data terminal according to another embodiment of the present invention.
Figure 20:
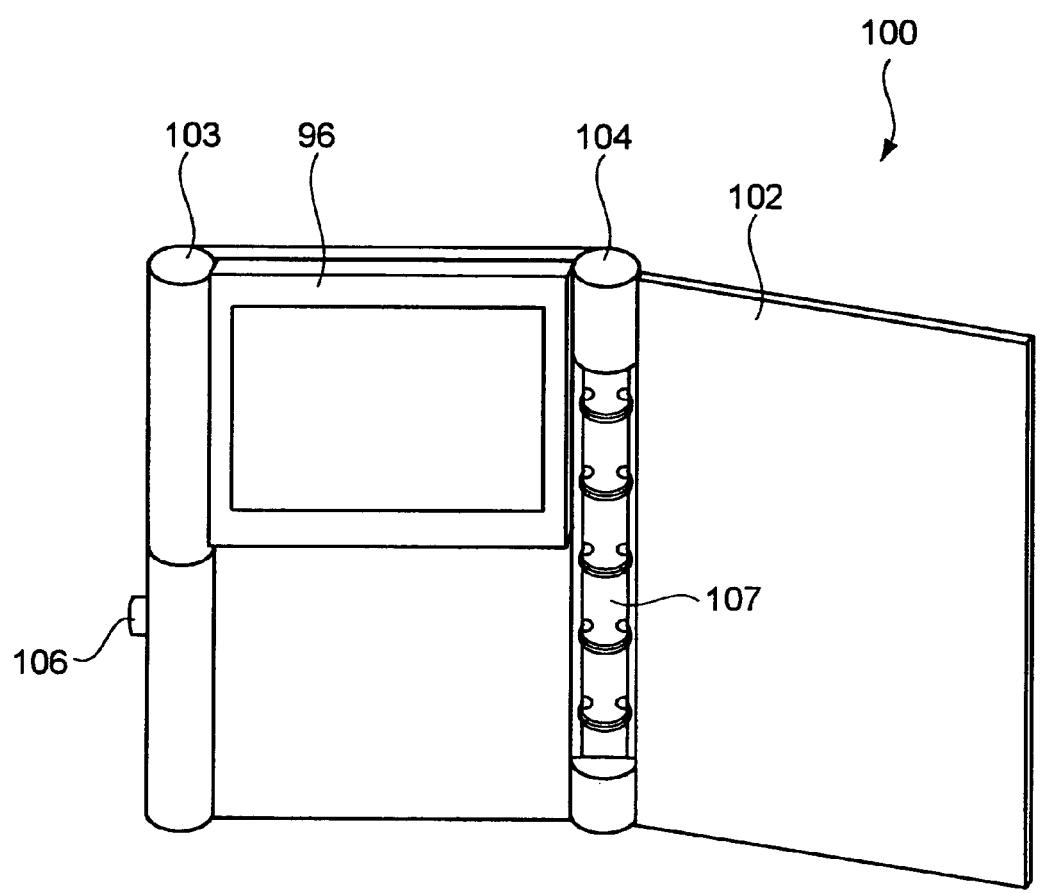
FIG. 20 is a perspective view of the binder-type data terminal, showing a state in which a display pivots toward the body for closing.
Figure 21:
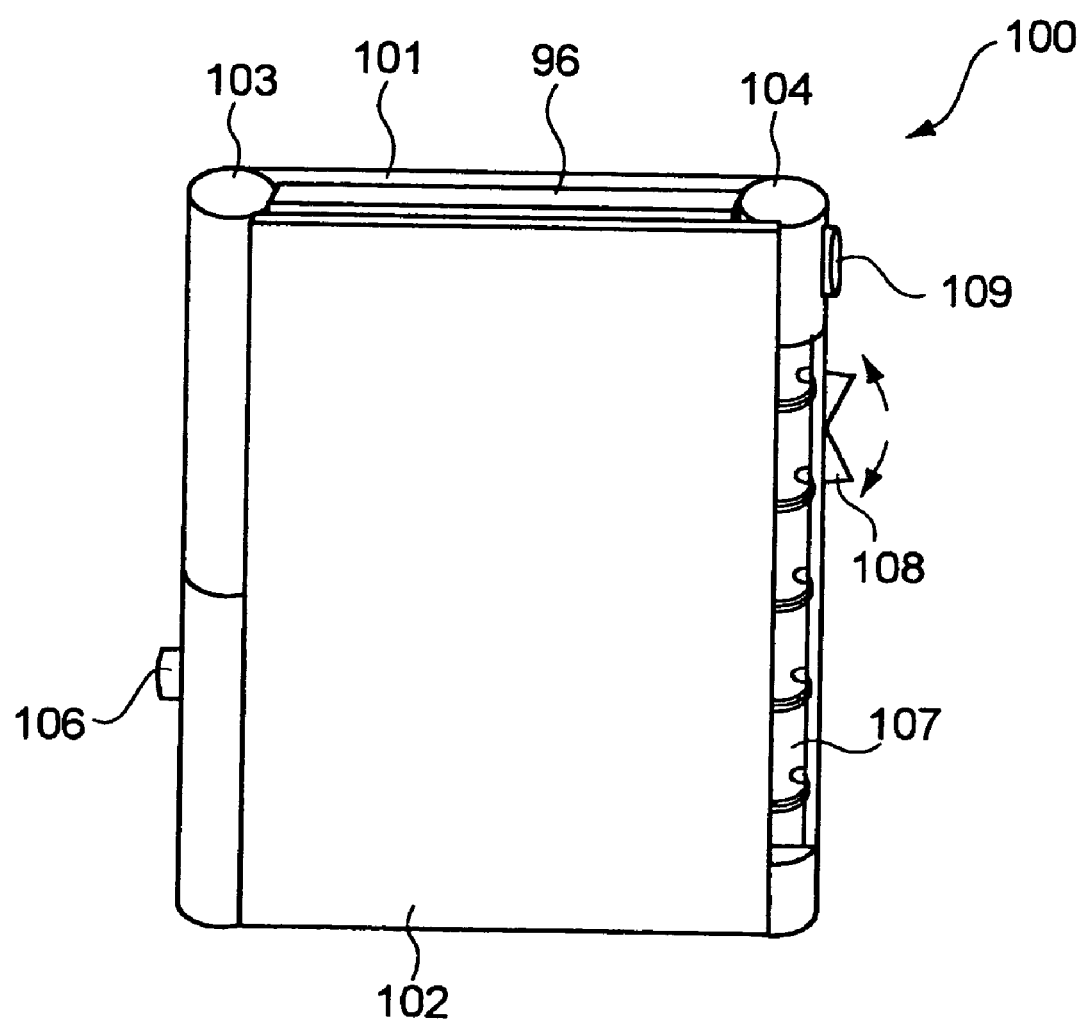
FIG. 21 is a perspective view of the binder-type data terminal, showing a state in which a flap pivots toward the body for closing.

FIG. 19 is a perspective view of a binder-type data terminal 100 according to an embodiment of the present invention. The binder-type data terminal 100 has a first shaft 103 and a second shaft 104 at both sides of a body 101. A display 96 is pivotably mounted to the first shaft 103 and a flap 102 is pivotably mounted to the second shaft 104. FIG. 20 shows a state in which the display 96 is pivoted toward the body 101 for closing. FIG. 21 shows a state in which the flap 102 is pivoted toward the body 101 for closing (with the display 96 in the state shown in FIG. 20). The user generally carries the data terminal in the state shown in FIG. 21.

The second shaft 104 has binder strips 107 to which media having printed content are detachably bound, as described below. The second shaft 104 also has a first camera 109 and a jog switch 108 that is below the first camera 109. The first camera 109 is a charge-coupled device (CCD) camera that a mobile phone or the like is generally provided with. The jog switch 108 is used for scrolling images displayed on the display 96.

Referring to FIG. 19, the body 101 has a mounting unit 99 at its lower part, in which a portable stick storage medium 98 is mounted. For example, content downloaded using the binder-type data terminal 100 can be stored in the storage medium 98 mounted in the mounting unit 99. Alternatively, a storage medium 98 bought from a seller, in which the code operation program is stored, can be installed in the binder-type data terminal 100.

The first shaft 103 has an operation button 106 or the like. The operation button 106 is mainly a so-called "OK" button.

The display 96 has a second camera 105 at its back side. The second camera 105 is for reading the graphic code information described above.

Figure 22:
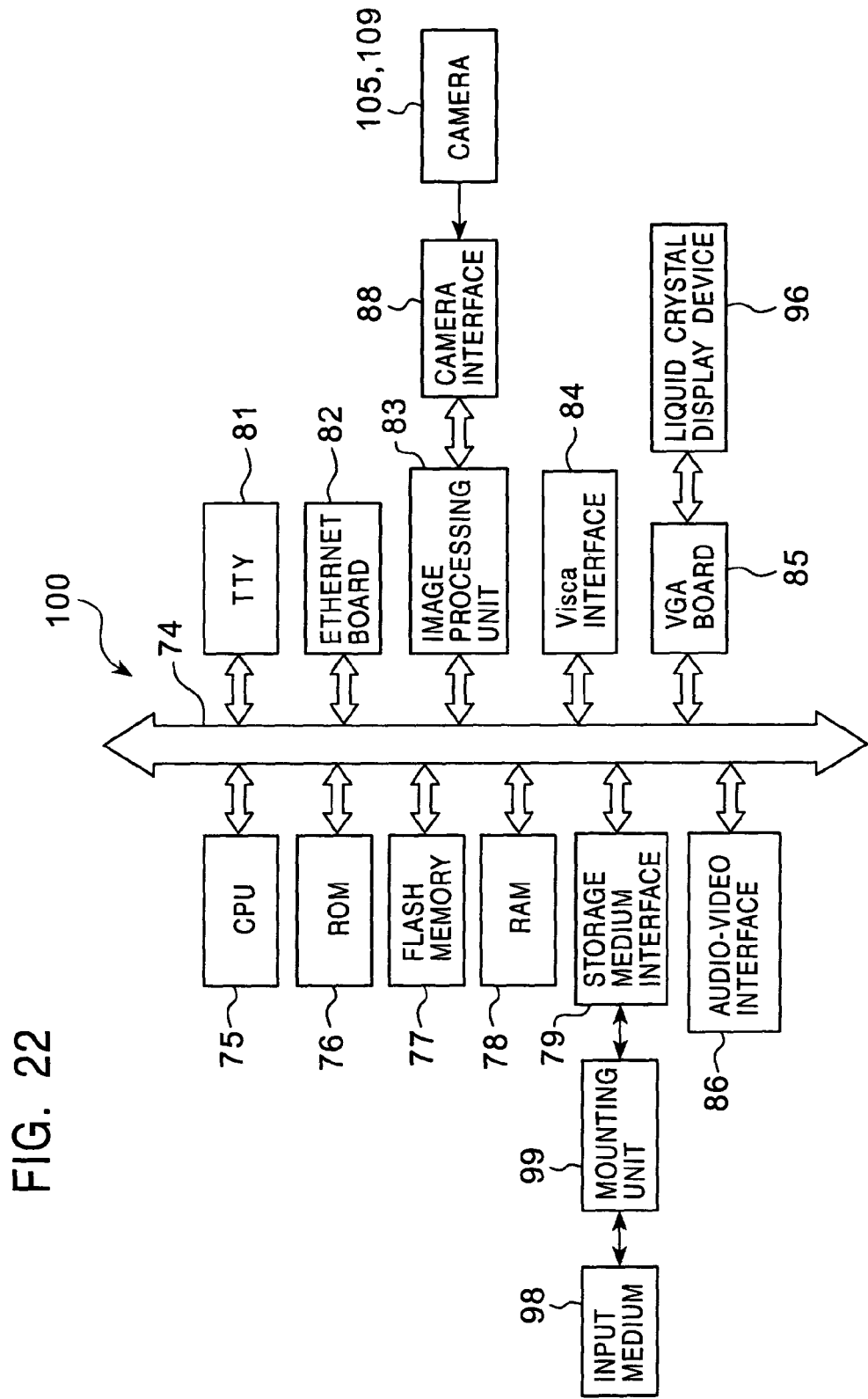
FIG. 22 is a block diagram showing the hardware structure of the binder-type data terminal.

FIG. 22 is a block diagram showing the hardware structure of the binder-type data terminal 100.

Referring to FIG. 22, the binder-type data terminal 100 has a CPU 75, a ROM 76, a flash memory 77, a RAM 78, a storage medium interface 79, and other interfaces such as a teletypewriter (TTY) 81, an Ethernet™ board 82, an image processing unit 83, a Visca interface 84, a VGA board 85, and an audio-video interface 86, all of which are connected to a main bus 74.

The CPU 75 totally controls the entire binder-type data terminal 100. The ROM 76 stores programs required for operating the CPU 75. The flash memory 77 stores necessary data, such as identification information unique to the binder-type data terminal 100. The RAM 78 is used as a working space for processing. The code operation program may be installed in the ROM 76 by default upon shipment of the binder-type data terminal 100.

The storage medium interface 79 is connected to the mounting unit 99 and communicates data to the storage medium 98 mounted in the mounting unit 99.

The TTY 81 is connected to various buttons in the operation area described above.

The Ethernet board 82 is connectable to an Ethernet network. The binder-type data terminal 100 is connected to, for example, a server through the Ethernet board 82 over the Ethernet network and is connected to the Internet through the server.

The image processing unit 83 is connected to a camera interface 88, to which the second camera 105 and the first camera 109 are connected. Images photographed by the second camera 105 can be imported into the binder-type data terminal 100 and can be displayed on the display 96.

The Visca interface 84 is connected to, for example, an external computer. Various controls of the binder-type data terminal 100 can be performed through the Visca interface 84.

The VGA board 85 is connected to the display 96 that may be a liquid crystal display device.

The audio-video interface 86 is connected to audio-video equipment. Signals sent from the audio-video equipment can be received in the binder-type data terminal 100 through the audio-video interface 86. Conversely, audio signals or image signals can be supplied to the audio-video equipment through the audio-video interface 86.

FIG. 23 is a perspective view of the binder-type data terminal 100 in a state in which the printed car images 45 or the printed horoscope images 46, as shown in FIG. 15, are bound to the binder strips 107. In the binder-type data terminal 100 having the car images 45 or horoscope images 46 that are bound, the pivoting of the display 96 toward the body 101 allows the second camera 105 provided on the display 96 to conveniently photograph the graphic codes 47 of the images.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A terminal device registrable on a network, comprising:
an input unit for inputting from a printed medium a first graphic code corresponding to first information; and
a communication unit programmed to use directly the first information as terminal identification information to establish communication through the network as registered device.

2. The terminal device according to claim 1, wherein
the input unit inputs from a printed medium a second graphic code corresponding to second information associated with the first information, and
the communication unit includes an acquiring unit for acquiring the second information based on the second graphic code.

3. The terminal device according to claim 2, wherein at least one of the first graphic code and the second graphic code is information encoded in accordance with predetermined image patterns.

4. The terminal device according to claim 1, wherein the input unit comprises a camera.

5. A method for communicating in a network, comprising:
registering a terminal device;
inputting from a printed medium a first graphic code corresponding to first information; and
using directly the first information as terminal identification information to establish communication through the network as a registered device.

6. The communication method according to claim 5, further comprising:
inputting from a printed medium a second graphic code corresponding to second information associated with the first information; and
acquiring the second information based on the second graphic code.

7. The communication method according to claim 6, wherein at least one of the first graphic code and the second graphic code is information encoded in accordance with predetermined image patterns.

8. The communication method according to claim 5, wherein the inputting step includes obtaining an image of the first graphic code using a camera.

9. A server, comprising:
a storage unit storing operating instructions and pieces of content, each of the operating instructions corresponding to one of a first series of graphic codes and each of the pieces of content corresponding to one of a second series of graphic codes;
an input unit for inputting from a printed medium a selected one of the first series of graphic codes corresponding to one of the operating instructions and a selected one of the second series of graphic codes corresponding to one of the pieces of content; and
an operating unit programmed to execute directly the one of the operating instructions with respect to the one of the pieces of content.

10. The server according to claim 9, wherein the input unit comprises a camera.

11. A method of processing content, comprising one or more computers implementing in the following steps:
establishing a series of operating instructions and a first series of graphic codes, each of the graphic codes in the first series of graphic codes corresponding to one of the operating instructions;
storing pieces of content and a second series of graphic codes, each of the graphic codes in the second series of graphic codes corresponding to one of the pieces of content;
selecting one of the operating instructions by inputting from a printed medium one of the first series of graphic codes corresponding to the selected operating instruction;
selecting one of the pieces of content by inputting from a printed medium one of the second series of graphic codes corresponding to the selected piece of content; and
processing the selected piece of content based on the selected operating instruction.

12. The method of processing content according to claim 11, further comprising:
storing storage locations for each of the pieces of content and a third series of graphic codes, each of the graphic codes in the third series of graphic codes corresponding to one of the storage locations;
inputting from a printed medium one of the third series of graphic codes corresponding to the storage location of the selected piece of content; and
retrieving the selected piece of content from the storage location.

13. A communication network, comprising:
a server storing data; and
a plurality of terminal devices programmed to send data to the server and to receive data from the server, each of the terminal devices including an input unit for inputting from a printed medium a first graphic code corresponding to first information, and a communication unit programmed to use directly the first information as terminal identification information to establish communication with the server.

14. The communication network according to claim 13, wherein the server includes
a storage unit storing operating instructions and pieces of content, each of the operating instructions corresponding to one of a first series of graphic codes and each of the pieces of content corresponding to one of a second series of graphic codes;
an input unit for inputting from a printed medium a selected one of the first series of graphic codes corresponding to one of the operating instructions and a selected one of the second series of graphic codes corresponding to one of the pieces of content; and
an operating unit programmed to execute the one of the operating instructions with respect to the one of the pieces of content.

15. A method of downloading content from a storage unit to a terminal device, comprising:
storing in the storage unit terminal identification information for the terminal device;

storing in the storage unit pieces of content and a first series of graphic codes, each of the graphic codes in the first series of graphic codes corresponding to one of the pieces of content;

selecting one of the pieces of content at the terminal device by inputting from a printed medium one of the graphic codes in the first series of graphic codes corresponding to the selected piece of content;

converting the one of the graphic codes in the first series of graphic codes into content information corresponding to the selected piece of content;

transmitting the content information and the terminal identification information from the terminal device to the storage unit;

retrieving the selected piece of content based on the content information; and transmitting the selected piece of content from the storage unit to the terminal device based on the terminal identification information.

16. The method of downloading content according to claim 15, further comprising:

establishing a series of operating instructions and a second series of graphic codes, each of the graphic codes in the second series of graphic codes corresponding to one of the operating instructions, the series of operating instructions including a download operating instruction;

selecting the download operating instruction at the terminal device by inputting from a printed medium one of the graphic codes in the second series of graphic codes corresponding to the download operating instruction;

converting the one of the graphic codes in the second series of graphic codes into operating information corresponding to the download operating instruction;

transmitting the operating information from the terminal device to the storage unit; and transmitting the selected piece of content from the storage unit to the terminal device based on the terminal identification information and the operating information.

* * * * *